(12) United States Patent
Vyssotski et al.

(10) Patent No.: US 7,020,786 B2
(45) Date of Patent: Mar. 28, 2006

(54) SYSTEM AND METHOD FOR SELECTING A VOLTAGE OUTPUT REFERENCE

(75) Inventors: Nikolai Vyssotski, Elgin, TX (US); John J. Breen, III, Harker Heights, TX (US); Brent A. McDonald, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 624 days.

(21) Appl. No.: 10/201,352

(22) Filed: Jul. 23, 2002

(65) Prior Publication Data
US 2004/0019815 A1    Jan. 29, 2004

(51) Int. Cl.
G06F 1/26 (2006.01)
G06F 1/32 (2006.01)

(52) U.S. Cl. ...................... 713/300; 713/330
(58) Field of Classification Search ......... 713/300–330
See application file for complete search history.

(56) References Cited

U.S. PATENT DOCUMENTS

| | | | | |
|---|---|---|---|---|
| 5,613,229 A | | 3/1997 | Baranowski et al. | 455/127 |
| 5,812,860 A | * | 9/1998 | Horden et al. | 713/322 |
| 5,959,441 A | | 9/1999 | Brown | 323/282 |
| 5,994,885 A | | 11/1999 | Wilcox et al. | 323/285 |
| 6,049,141 A | | 4/2000 | Sieminski et al. | 307/44 |

(Continued)

OTHER PUBLICATIONS

Intel Corporation Application Note AP-587, "Slot 1 Processor Power Distribution Guidelines", May 1997.
"Advanced Configuration and Power Interface Specification", Revision 2.0, Contents and Sections 8.1 and 8.2, Jul. 27, 2000.

*Primary Examiner*—Dennis M. Butler
(74) *Attorney, Agent, or Firm*—Baker Botts L.L.P.

(57) ABSTRACT

A system and method for selecting a voltage output reference required of a DC-DC converter included in a power supply, the voltage output reference corresponding to an operating state of the power supply load. The method stores data for the voltage output reference required for each of a plurality of operating states of the load in a corresponding register. A control input that identifies an operating state of the load is received. An output of the register is selected in response to the control input. The voltage output reference required for the operating state of the load is generated in response to the selected output from the register. An apparatus for selecting a voltage output reference required by a load with a plurality of operating states includes a plurality of registers. Each of the plurality of registers has a register input and a register output, and is configurable to store data corresponding to a voltage required by the load for each of a plurality of operating states. The apparatus also includes a decoder having at least one input and at least one output. The inputs include a plurality of voltage inputs, and a control input. The output includes the voltage output reference. Each of the plurality of voltage inputs are coupled to the respective register output.

20 Claims, 5 Drawing Sheets

U.S. PATENT DOCUMENTS

| | | | |
|---|---|---|---|
| 6,127,815 A | 10/2000 | Wilcox | 323/282 |
| 6,304,066 B1 | 10/2001 | Wilcox et al. | 323/282 |
| 6,307,356 B1 | 10/2001 | Dwelley | 323/282 |
| 6,366,066 B1 | 4/2002 | Wilcox | 323/282 |
| 6,471,716 B1 | 10/2002 | Pecukonis | 607/89 |
| 6,476,589 B1 | 11/2002 | Umminger et al. | 323/282 |
| 6,580,258 B1 | 6/2003 | Wilcox et al. | 323/282 |
| 6,691,235 B1 * | 2/2004 | Garcia et al. | 713/300 |
| 6,697,952 B1 * | 2/2004 | King | 713/300 |
| 6,748,545 B1 * | 6/2004 | Helms | 713/300 |
| 6,766,486 B1 * | 7/2004 | Neeb | 714/724 |
| 6,772,356 B1 * | 8/2004 | Qureshi et al. | 713/321 |
| 6,845,456 B1 * | 1/2005 | Menezes et al. | 713/320 |
| 6,889,332 B1 * | 5/2005 | Helms et al. | 713/322 |
| 2003/0065960 A1 * | 4/2003 | Rusu et al. | 713/300 |

* cited by examiner

SYSTEM AND METHOD FOR SELECTING A VOLTAGE OUTPUT REFERENCE

BACKGROUND OF THE INVENTION

1. Field of the Invention

The present invention generally relates to the field of DC power supplies. More specifically, the present invention relates to a technique for selecting voltage output reference of a DC-DC converter included in a computer system in response to an operating state of the computer system.

2. Description of the Related Art

Information systems in general have attained widespread use in business as well as personal computing environments. An information handling system, as referred to herein, may be defined as an instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. The information handling system may be configured for a specific user application or requirement such as financial transaction processing, airline reservations, enterprise data storage and/or global communications. In general, an information handling system may include a variety of hardware and/or software components that may be configured to provide information and/or consume information. An information handling system may include one or more computer systems, data storage systems, and/or networking systems.

A computer system, which is one common type of information handling system, may be designed to give independent computing power to one or a plurality of users. Computer systems may be found in many forms including, for example, mainframes, minicomputers, workstations, servers, clients, personal computers, Internet terminals, notebooks, personal digital assistants, and embedded systems.

A computer system may be available as a desktop, floor-standing unit, or as a portable unit. The computer system typically includes a microcomputer unit having a processor, volatile and/or non-volatile memory, a display monitor, a keyboard, one or more floppy diskette drives, a hard disc storage device, an optional optical drive, e.g., DVD, CD-R, CD-RW, Combination DVD/CD-RW or CD-ROM, and an optional printer. A computer system also includes an operating system, such as Microsoft Windows XP™ or Linux. A computer system may also include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other computer systems communicating with each other via a network. These PO devices are typically plugged into connectors of computer system I/O interfaces such as serial interfaces and parallel interfaces, for example. Generally, these computer systems use a system board or motherboard to electrically interconnect these devices.

Typically, information handling systems are powered by a power supply system that receives and converts alternating current ("AC") power to direct current ("DC") power that is used to power the information handling system components such as the system processor. In one type of AC-DC power supply used to supply current at DC voltages, power is converted from an AC power source, such as 120 V, 60 Hz or 220 V, 50 Hz power, from a wall outlet. This is accomplished by first rectifying the AC voltage of the power source to an unregulated DC voltage. The unregulated DC voltage typically has a ripple waveform component. To "smooth" the ripple component, most power supplies incorporate a bulk filter capacitor or bulk reservoir capacitor. Typically, a bulk filter capacitor stores charge during the ripple peaks and releases charge during the low portion of the ripple cycle. In addition, AC-DC power supplies may typically include a DC-DC converter for providing DC power to the computer system within specified tolerances.

Typical DC-DC converters incorporate a switching circuit, a controller circuit, resistors, and diodes, in combination with a single-stage LC filter. The typical switching power supply is described in further detail in the text "Switching Power Supply Design", Abraham I. Pressman, Second Edition, published by McGraw Hill, ISDN 0-07052236-7.

Advances in processor technology have consistently driven down the supply voltages required to operate processors, thereby reducing power consumption. The supply voltage for processors, which is presently in the +1.0 V to +2.5 V range, may soon extend below 1.0 V. The newer processors, such as Intel's Pentium class of processors, typically specify a profile or load line that defines the relationship between the processor supply voltage and the current drawn by the processor. For example, Application Note AP-587, "Slot 1 Processor Power Distribution Guidelines", August 1998, Order Number: 243332-002, published by Intel Corporation describes the power requirements. It is quite common for processor manufacturers to make frequent changes to the supply voltages required by the processor. The dynamic voltage requirements can be a challenge, especially when extensive changes to the printed circuit boards are often required to accommodate the changes.

Present processor designs typically support a plurality of power operating states. For example, the Advanced Configuration and Power Interface (ACPI) specification, Revision 2.0, Jul. 27, 2000, published by Compaq Computer Corporation, Intel Corporation, Microsoft Corporation, Phoenix Technologies Ltd., and Toshiba Corporation typically defines various processor power states such as C0, C1, C2, C3, and C4. The Processor manufacturers typically require that transitions between these power operating states take place very rapidly, e.g., in less than 100 µs. To control the voltage output reference of the DC-DC converter, traditional methods and systems have relied on using multiplexers external to DC-DC controller. The use of multiplexers consumes valuable printed circuit board space and adds to the cost. Furthermore, in some cases the suspend, or startup, state voltage of the processor is selected by tying the DC-DC controller startup voltage state select pins to $V_{CC}$, REF and/or GND depending on the controller used. When the processor specification regarding the voltage required may necessitate a redesign of the printed board to support the new voltage. Present practice is to add resistor-strapping options to the DC-DC controller startup state pins to allow support of all possible startup state voltages. However, this option also results in the consumption of additional board space and typically results in a higher cost.

Present processors used in information handling systems have a feature called voltage identification ("VID") which allows the processor to program the motherboard's power management system, e.g., a voltage regulator module ("VRM"), to deliver the proper voltage to the processor. The VID input to the power management system is typically a 5-bit digital signal, e.g., VID0-4. Newer versions of the VID input may use additional bits, e.g., VID0-5. Some DC-DC controllers, included in the power management system, have impedance-type selection pins at their voltage identification input that can source or sink current determining setting, by sampling voltage or impedance of the external resistor/capacitor networks. This design typically requires the use of unique board ID's or part numbers, thereby limiting support of various processors with different voltage state requirements. One example of a DC-DC controller is the Maxim MAX1718 controller from Maxim Integrated Products, Sunnyvale, Calif. The MAX1718 controller provides impedance-type selection pins at their voltage identification input and/or supports resistor strapping options.

What is needed is a DC-DC controller that effects rapid switchover between the allowable processor power operating state voltages. The voltages required by the processor are preferably configurable, without requiring the addition of a separate multiplexer and/or resistor-strapping option. Eliminating the need for separate components such as resistors also accomplishes an objective of reducing printed circuit board space.

SUMMARY OF THE INVENTION

In accordance with the present invention, a method and a system thereof for selecting a voltage output reference required of a DC-DC converter included in a power supply is described. The voltage output reference corresponds to an operating state of the power supply load.

In one embodiment, the method stores data for the voltage output reference required for each of a plurality of operating states of the load in a corresponding register. A control input that identifies an operating state of the load is received. An output of the register is selected in response to the control input. The voltage output reference required for the operating state of the load is generated in response to the selected output from the register.

In another embodiment, the method generates a startup voltage output reference of the DC-DC converter when power is initially provided to the load, e.g., a processor. After identifying the type of processor, data corresponding to a voltage required for each of a plurality of operating states of the identified processor is read from memory coupled to the processor. Data is transferred to a register, corresponding to each of the plurality of operating states. Control input representing an operating state of the processor is received and an output of a register corresponding to the operating state of the processor is selected. The output voltage required by the DC-DC converter is generated in response to receiving the output of the register.

In yet another embodiment, the method for determining a voltage applied to a processor that has a plurality of operating states and a startup state, the voltage depending on the state of the processor includes storing data corresponding to a first operating state voltage in a first operating state register. Data corresponding to a second operating state voltage is stored in a second operating state register and data corresponding to a startup state voltage is stored in a startup state register. The respective outputs of the first operating state register, the second operating state register and the startup state register are coupled to a decoder. A control signal is applied to the decoder so that the control signal determines a reference voltage that appears at the decoder output, the reference voltage corresponding to one of the first operating state voltage, the second operating state voltage or the startup voltage.

In one embodiment, an apparatus for selecting a voltage output reference required by a load with a plurality of operating states includes a plurality of registers. Each of the plurality of registers has a register input and a register output, and is configurable to store data corresponding to a voltage required by the load for each of a plurality of operating states. The apparatus also includes a decoder having at least one input and at least one output. The inputs include a plurality of voltage inputs, and a control input. The output includes the voltage output reference. Each of the plurality of voltage inputs are coupled to the respective register output.

In one embodiment, a system implementing a method for selecting a voltage output reference required of a DC-DC converter included in a power supply includes a processor, a system bus, a memory system coupled to the processor through the system bus, and a power management system coupled to the processor through the system bus. The power management system includes a DC-DC controller that includes a plurality of operating state registers for storing data corresponding to operating state voltages of the processor. The plurality of operating state registers includes a startup state register for storing data corresponding to a startup state voltage. The DC-DC controller also includes a decoder having a plurality of voltage inputs, each of the voltage inputs coupled to respective one of the operating state registers including the startup state register. The decoder also has a control input, and provides a reference voltage at an output in response to the control input.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For a thorough understanding of the subject invention, including the best mode contemplated by the inventor for practicing the invention, reference may be had to the following Detailed Description, including the appended claims, in connection with the above-described Drawings. The following Detailed Description of the invention is intended to be illustrative only and not limiting.

A DC-DC converter that enables the selection of variable voltage output references that may be required by a load, such as a processor, described below, may be included in virtually any and all electrical devices such as computers, telecommunications equipment, consumer electronics and the like. A power supply system, which includes the DC-DC converter, may be coupled to loads requiring a dynamic voltage input reference corresponding to an operating state of the load. In one embodiment, the power supply systems may be advantageously included in an information handling system described below to potentially improve the adaptability of the DC-DC converter to changes in the required load voltage.

Figure 1:
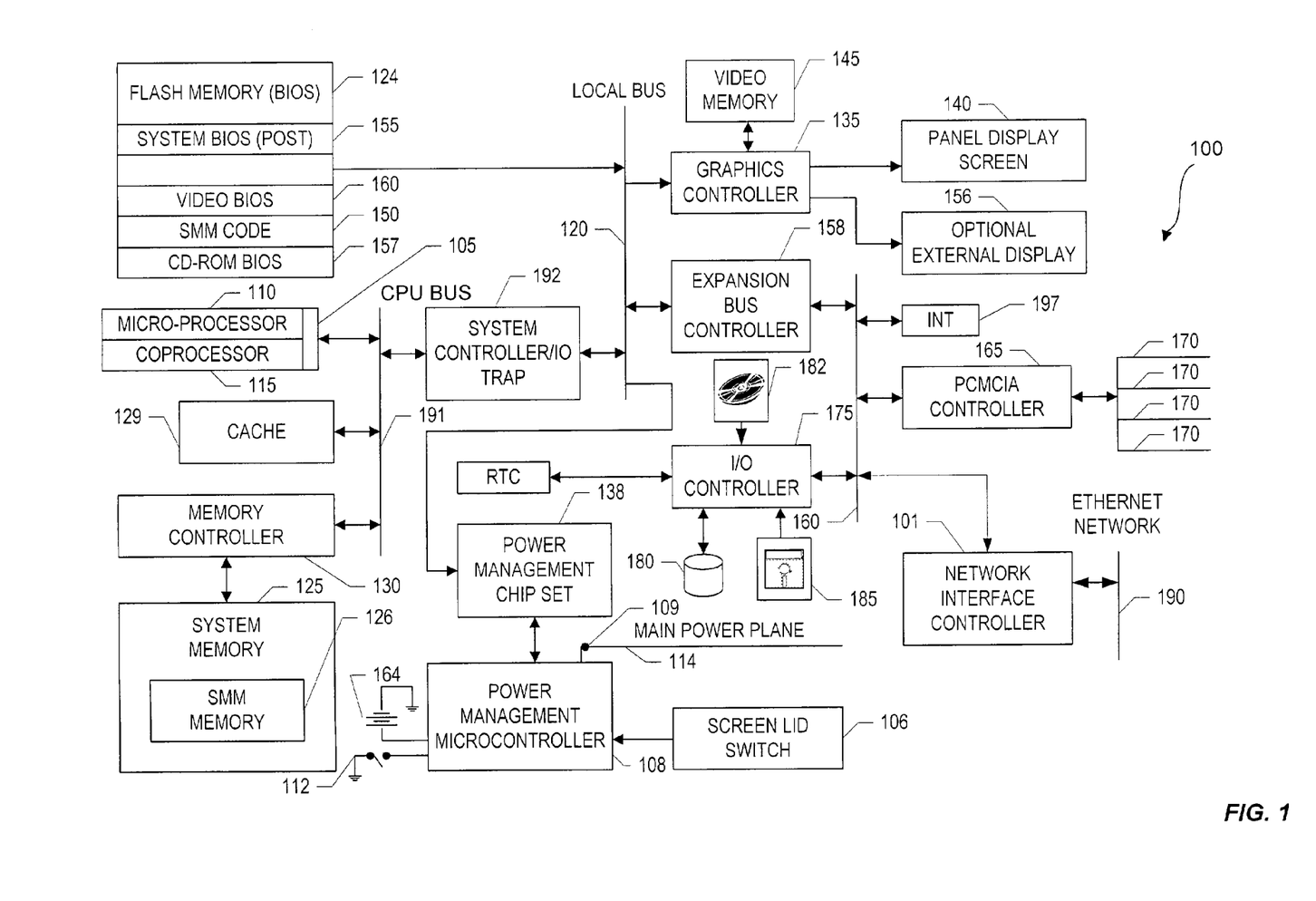
FIG. 1 illustrates an information handling system, which includes a circuit for selecting a voltage output reference required of a DC-DC converter.

Referring to FIG. 1, an information handling system 100 is shown that includes a circuit for selecting a voltage output reference required of a DC-DC converter. In one embodiment, the information handling system 100 is a computer system.

Information handling system 100 includes a processor ("processor") 105, for example, an Intel Pentium™ class microprocessor or an AMD Athlon™ class microprocessor, having a micro-processor 110 for handling integer operations and a coprocessor 115 for handling floating point operations. Processor 105 is coupled to cache 129 and memory controller 130 via processor bus 191. System controller I/O trap 192 couples processor bus 191 to local bus 120 and is generally characterized as part of a system controller such as a Pico Power Vesuvious or an Intel™ Mobile Triton chip set. System controller I/O trap 192 can be programmed in a well known manner to intercept a particular target address or address range, and, upon intercepting a target address, system controller I/O trap 192 asserts an intercept signal indicating that processor 105 attempted to access the target address.

A main memory 125 of dynamic random access memory ("DRAM") modules is coupled to local bus 120 by a memory controller 130. Main memory 125 includes a system management mode ("SMM") memory area. A basic input output system ("BIOS") memory 124 is coupled to local bus 120. A FLASH memory or other nonvolatile memory is used as BIOS memory 124. A BIOS program (not shown) is usually stored in the BIOS memory 124. The BIOS program includes CD-ROM BIOS 157 software for interaction with the information handling system boot devices such as the CD-ROM 182. The BIOS memory 124 stores the system code, which controls some information handling system 100 operations.

In a simple form, an information handling system 100 may include a processor 105 and a memory 125. Processor 105 is typically enabled to execute instructions stored in the memory 125. The executed instructions typically perform a function. Information handling systems may vary in size, shape, performance, functionality and price. Examples of an information handling system 100, which include a processor 105 and memory 125, may include all types of computing devices within the range from a pager to a mainframe computer.

A graphics controller 135 is coupled to local bus 120 and to a panel display screen 140. Graphics controller 135 is also coupled to a video memory 145, which stores information to be displayed on panel display 140. Panel display 140 is typically an active matrix or passive matrix liquid crystal display ("LCD"), although other display technologies may be used as well. Graphics controller 135 can also be coupled to an optional external display or standalone monitor display. One graphics controller that can be employed as graphics controller 135 is the Western Digital WD90C14A graphics controller.

A bus interface controller or expansion bus controller 158 couples local bus 120 to an expansion bus 160. In a particular embodiment, expansion bus 160 is an Industry Standard Architecture ("ISA") bus, although other buses, for example, a Peripheral Component Interconnect ("PCI") bus, may also be used. A personal computer memory card international association ("PCMCIA") controller 165 is also coupled to expansion bus 160 as shown. PCMCIA controller 165 is coupled to a plurality of expansion slots 170 to receive PCMCIA expansion cards such as modems, fax cards, communications cards, and other input/output devices. Interrupt request generator 197 is also coupled to ISA bus 160 and issues an interrupt service request over a predetermined interrupt request line after receiving a request to issue interrupt instruction from processor 105.

The System Management Bus ("SMBus") (not shown) is a two-wire interface through which various system component chips can communicate with each other and with the rest of the system. The System Management Bus Specification, Version 2.0, published Aug. 3, 2000 provides additional detail. The original purpose of the SMBus was to define the communication link between an intelligent battery, a charger for the battery and a microcontroller that communicates with the rest of the system. However, SMBus is advantageously used to connect a wide variety of devices including power-related devices, such as DC-DC converters and more.

An I/O controller 175, often referred to as a super I/O controller, is coupled to ISA bus 160. I/O controller 175 interfaces to an integrated drive electronics ("IDE") hard drive 180, a CD-ROM drive 182 and a floppy drive 185. A network interface controller 101 enables the information handling system 100 to communicate with a computer network such as an Ethernet 190. The computer network may include a network such as a local area network ("LAN"), wide area network ("WAN"), Internet, Intranet, wireless broadband or the like. The network interface controller 101 forms a network interface for communicating with other information handling systems (not shown) connected to the Ethernet 190 for implementing a method of enabling removal of a removable medium of a boot device included in the information handling system 100 that is connected to the network of other information handling systems. The information handling system's networking components generally include hardware as well as software components. Examples of the hardware components include the network interface controller 101 and the Ethernet 190. Examples of the software components, which include messaging services and network administration services, are described below.

The information handling system 100 serves as a controller for resolving proprietary and standard event and message structures into a common format for use by the information handling network for many management purposes. The information handling system 100 is connected with a plurality of information handling systems in the network for receiving messages from the information handling systems, analyzing the messages and determine an effective utilization of the messages as directed by a user or network administrator. The information handling system 100 receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. The information handling system 100 supports the conversion of messages into the common format to facilitate particular network applications.

Information handling system 100 includes a power supply 164, which includes various types of power supplies for converting power from AC-to-DC and/or DC-to-DC. The power supplies may be housed within the information handling system 100 enclosure or may be housed external to the information handling system 100 enclosure. In one embodiment, the power supply 164 includes a DC-DC converter that is enabled to select voltage output reference required by the various power operating states of processor 105.

When the information handling system 100 is a laptop or notebook computer, for example, power supply 164 may be a rechargeable battery, such as a nickel metal hydride ("NiMH") or lithium ion battery. Power supply 164 is coupled to a power management microcontroller 108 that controls the distribution of power from power supply 164. More specifically, microcontroller 108 includes a power output 109 coupled to the main power plane 114 that supplies power to processor 105. Power microcontroller 108 is also coupled to a power plane (not shown) that supplies power to panel display 140. For example, in a particular embodiment, power control microcontroller 108 may be a Motorola 6805 microcontroller. Microcontroller 108 monitors the charge level of power supply 164 to determine when to charge and when not to charge battery 164. Microcontroller 108 is coupled to a main power switch 111 that the user actuates to turn the information handling system 100 on and off. Although microcontroller 108 powers down other portions of information handling system 100, such as hard drive 180, when not in use to conserve power, microcontroller 108 itself is always coupled to a source of energy, namely power supply 164.

In a portable embodiment, information handling system 100 also includes a screen lid switch or indicator, 106 that provides one indication when panel display 140 is in the open position and another indication when panel display 140 is in the closed position. It is noted that panel display 140 is generally located in the same location in the lid of the computer as is typical for "clamshell" types of portable computers, such as laptop or notebook computers. In this manner, the display screen forms an integral part of the lid of the computer, which swings from an open position for interaction with the user to a closed position.

Information handling system 100 also includes a power management chip set 138, which may include, for example, power management chip model PT86C511 manufactured by Pico Power. Power management chip set 138 is coupled to processor 105 via local bus 120 so that power management chip set 138 can receive power control commands from processor 105. Power management chip set 138 is connected to a plurality of individual power planes that supply power to respective devices in information handling system 100, such as hard drive 180 and floppy drive 185. In this manner, power management chip set 138 acts under the direction of processor 105 to control the power to the various power planes and devices of the information handling system. A real time clock ("RTC") 140 is coupled to I/O controller 175 and power management chip set 138 such that time events or alarms can be transmitted to power management chip set 138. Real time clock 140 can be programmed to generate an alarm signal at a predetermined time.

Each processor manufacturer may define various power operating states of processor 105. These power operating states, which may not have a one-to-one correspondence with the ACPI power operating states, may be mapped to the ACPI C0 through C4 power states. For example, one manufacturer may provide support for halt, stop grant, stop clock, etc. commands or instructions that are specific to the its processors. Similarly, a second manufacturer may have different names for the power states C0–C4 that are implemented for its processors, and power state mappings may also be different.

In one embodiment, processor 105 may support power states in addition to the C0–C4 defined in ACPI. In one embodiment, processor 105 supports the following processor power states (the equivalent C0–C4 ACPI power state mapping is included in the parenthesis):

1) Normal State (ACPI C0 State)—The Normal state of processor 105 is the normal operating mode where the processor's core clock is running and processor 105 is actively executing instructions.

2) Quick Start State (Typically mapped to C1 in ACPI)—This is a mode entered by processor 105 with the assertion of the STPCLK# signal when it is configured for the Quick Start state (via the A15# strapping option). In the Quick Start state processor 105 is typically capable of acting on snoop transactions generated by the system bus (not shown) priority device. Because of its snooping behavior, Quick Start may be typically used in an uni-processor (UP) configuration.

A transition to the Deep Sleep state may be made by stopping the clock input to processor 105. A transition back to the Normal state (from the Quick Start state) is made if the STPCLK# signal is deasserted. While in this state the processor is limited in its ability to respond to input. It is incapable of latching any interrupts, servicing snoop transactions from symmetric bus masters or responding to FLUSH# or BINIT# assertions. While processor 105 is in the Quick Start state, it will generally not respond properly to any input signal other than STPCLK#, RESET#, or BPRI#. If any other input signal changes, then the behavior of the processor may be unpredictable. No serial interrupt messages may begin or be in progress while the processor is in the Quick Start state. RESET# assertion will cause the processor to immediately initialize itself, but the processor will stay in the Quick Start state after initialization until STPCLK# is deasserted.

3) Sleep State (typically mapped to C2 state in ACPI)—The Sleep state is a very low-power state in which processor 105 maintains its context and the phase-locked loop (PLL) maintains phase lock. The Sleep state may generally be entered from the Stop Grant state. After entering the Stop Grant state, the SLP# signal may be asserted, causing the processor to enter the Sleep state. The SLP# signal is not recognized in the Normal or Auto Halt states.

Processor 105 may be reset by the RESET# signal while in the Sleep state. If RESET# is driven active while the processor is in the Sleep state then SLP# and STPCLK# must immediately be driven inactive to ensure that the processor correctly initializes itself.

Input signals (other than RESET#) may not change while the processor is in the Sleep state or transitioning into or out of the Sleep state. Input signal changes at these times may cause unpredictable behavior. Thus, the processor is generally incapable of snooping or latching any events in the Sleep state.

While in the Sleep state, processor 105 may enter its lowest power state (typically mapped to C4 state in ACPI), the Deep Sleep state. Removing the processor's input clock generally puts the processor in the Deep Sleep state. PICCLK may be removed in the Sleep state.

4) Deep Sleep State (Typically mapped to C4 state in ACPI)—The Deep Sleep state is the lowest power mode the processor may enter while maintaining its context. The Deep Sleep state is entered by stopping the BCLK input to the processor, while it is in the Sleep or Quick Start state. For proper operation, the BCLK input should be stopped in the Low state.

The processor will return to the Sleep or Quick Start state from the Deep Sleep state when the BCLK input is restarted. Due to the PLL lock latency, there may be a delay of up to 30 microseconds after the clocks have started before this state transition happens. PICCLK may be removed in the Deep Sleep state. PICCLK should be designed to turn on when BCLK turns on when transitioning out of the Deep Sleep state. The input signal restrictions for the Deep Sleep state are the same as for the Sleep state, except that RESET# assertion will result in unpredictable behavior.

Power consumed by a processor may also depend on the clock frequency of the processor, in addition to the operating state of the processor. Some chipset manufacturers enable controlling power consumed by processor 105 by controlling the frequency of the clock applied to processor 105. For example, in the portable embodiment, processor 105 may be operable in at least two modes, e.g., a performance mode or in a battery mode. In the performance mode, processor 105 typically receives power from an AC source. In the performance mode of operation, the processor clock is typically operable at the highest supported clock rate. While operating in a battery mode, the clock frequency applied to processor may be lower than the maximum supported frequency, thereby consuming less power in the battery mode compared to the performance mode. Thus power consumed by processor 105, may depend on two variables: clock frequency of processor 105 and the operating state of processor 105.

For each mode of operation and/or power operating state, the system/chipset manufacturer typically specifies the required voltage input for proper operation. The required voltage input is received as an input by the DC-DC converter, e.g., as VID0-4 inputs. In response, the DC-DC converter generates the voltage output reference required for the load. In one embodiment, a table that includes data that corresponds to various processor power operating states and modes for each processor type and the corresponding required voltages for each mode and/or operating state is stored in BIOS memory 124. The table includes operating state/voltage entries for various processor types included in a family of processors.

The output voltage reference of a DC-DC converter may be adjusted through a 5-bit digital-to-analog converter (DAC) over a specified voltage range. In one embodiment, the DC-DC controller is configured to receive three unique 5-bit VID DAC control codes enabled to control up to 8 modes and/or operating states of processor 105.

When information handling system 100 is turned on or powered up, the information handling system 100 enters a start up phase, also referred to as a boot up phase, during which information handling system 100 hardware is detected and the operating system is loaded. In one embodiment that includes information handling system 100 with the Windows NT® operating system, the boot up process is typically divided into multiple stages. The initial boot stages pertain to start up of the system components of information handling system 100 and the latter stages typically pertains to the boot up of networking components of information handling system 100.

During the initial boot stages, information handling system 100 BIOS software stored in non-volatile BIOS memory 124 is copied into main memory 125 so that it can be executed more quickly. This technique is referred to as "shadowing" or "shadow RAM". At this time, system management mode ("SMM") code 150 is copied into the system management mode memory area 126 of main memory 125. Processor 105 executes SMM code 150 after processor 105 receives a system management interrupt ("SMI") that causes the microprocessor to enter SMM. It is noted that along with SMM code 150, also stored in BIOS memory 124 and copied into main memory 125 at power up are system BIOS 155 including a power on self test module ("P.O.S.T."), CD-ROM BIOS 157 and video BIOS 160. It will be recognized by those of ordinary skill in the art that other memory mapping schemes may be used. For example, SMM code 150 may be stored in fast SRAM memory (not shown) coupled to the local/processor bus 120.

Figure 2:
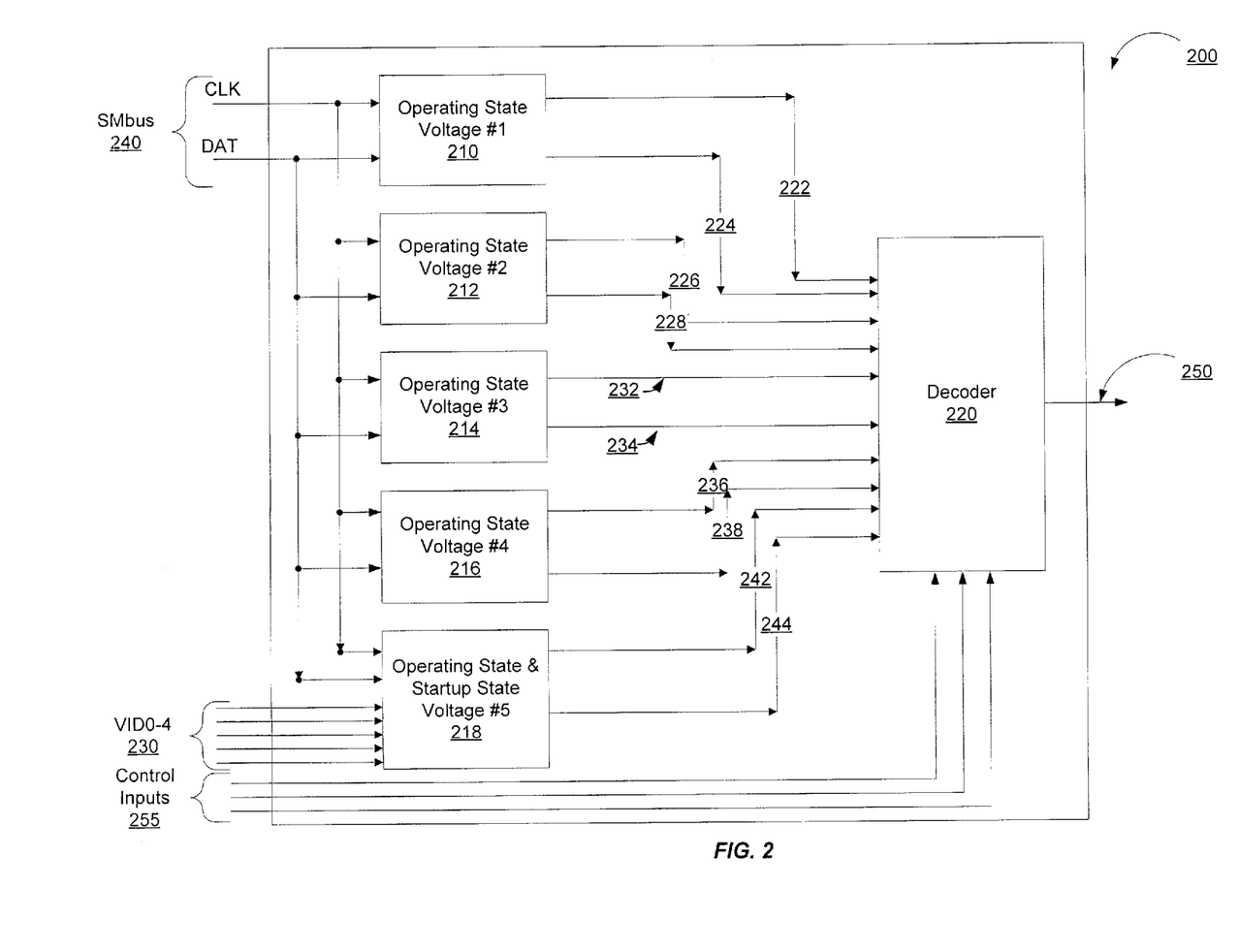
FIG. 2 shows a block diagram of a DC-DC converter for selecting a voltage output reference required by the load.

Referring to FIG. 2, an illustrative block diagram of a DC-DC converter 200 for selecting a voltage output reference required by the load, e.g., processor 105, in accordance with one aspect of the invention, is shown. The load is operable to consume various amounts of power depending upon a particular load power operating state. The voltage required by the load also varies, and is typically dependent on the load operating state.

DC-DC converter 200 includes a plurality of registers, e.g., latching registers. A latching register is a register that latches on to data received at an input, retains the data after the data has been removed from the input and provides the latched data to another device as an output. In one embodiment, the register is coupled to a system bus, e.g., SMbus 240, and is configured to receive data from the SMbus 240. The exact number of registers may be variable and may depend on the potential number of operating states for processor 105.

In one embodiment, 5 registers 210, 212, 214, 216 and 218 are included in DC-DC converter 200 representing five different operating states. In one embodiment, one of the five operating states may include a startup state. For example, operating state #1 may be configured as normal state (e.g., ACPI C0 state) in performance mode. Data corresponding to operating state #1 is stored in corresponding register 210. Similarly, operating state #2 may be configured as a deep sleep state (e.g., ACPI C4 state) in performance mode. Data corresponding to operating state #2 is stored in corresponding register 212. Thus, each of the plurality of registers 210, 212, 214, 216 and 218 is configurable to store data corresponding to a respective voltage required by the load, e.g., processor 105, for each of the plurality of operating states and/or operating modes of the load.

The plurality of registers 210, 212, 214, 216 and 218 includes a startup state register 218 that corresponds to a startup state of processor 105. Unlike other registers, the startup state register 218 may also be configured to receive the VID signals as input, in addition to system bus, e.g., SMbus 240. In one embodiment, on initial power on condition, the startup state register 218 is enabled to receive inputs, e.g., VID0-4 230, from processor 105. Since, processor is in a startup state, SMbus 240 is not enabled to perform normal operation. Processor 105 is configured to operate in the normal state (e.g., ACPI C0 state) and in battery mode on startup. The output of the startup state register 218 is used to generate the voltage output reference 250 on initial power on condition.

DC-DC converter 200 also includes a decoder 220. Decoder 220 is coupled to the plurality of registers 210, 212, 214, 216 and 218 as voltage inputs. Decoder 220 provides the voltage output reference 250 as required. Each of the plurality of voltage inputs is coupled to a respective register output. The decoder inputs also include at least one control input 255. If the number of possible operating states and/or modes for processor 105 are less than or equal to $2^N$, then the number of control inputs 255 required to uniquely correspond to each of the possible operating state is N. For example, to uniquely identify 5 operating states the minimum number of control inputs 255 required are 3. Thus, each of the plurality of control inputs 255 uniquely corresponds to or identifies each of the plurality of operating states. In one embodiment, the control input 255 is operable to cause decoder 220 to select a respective one of the plurality of register outputs. Decoder 220 is operable to generate at least one output, e.g., voltage output reference 250, required by the load in response to the load's current operating state.

Figure 3:
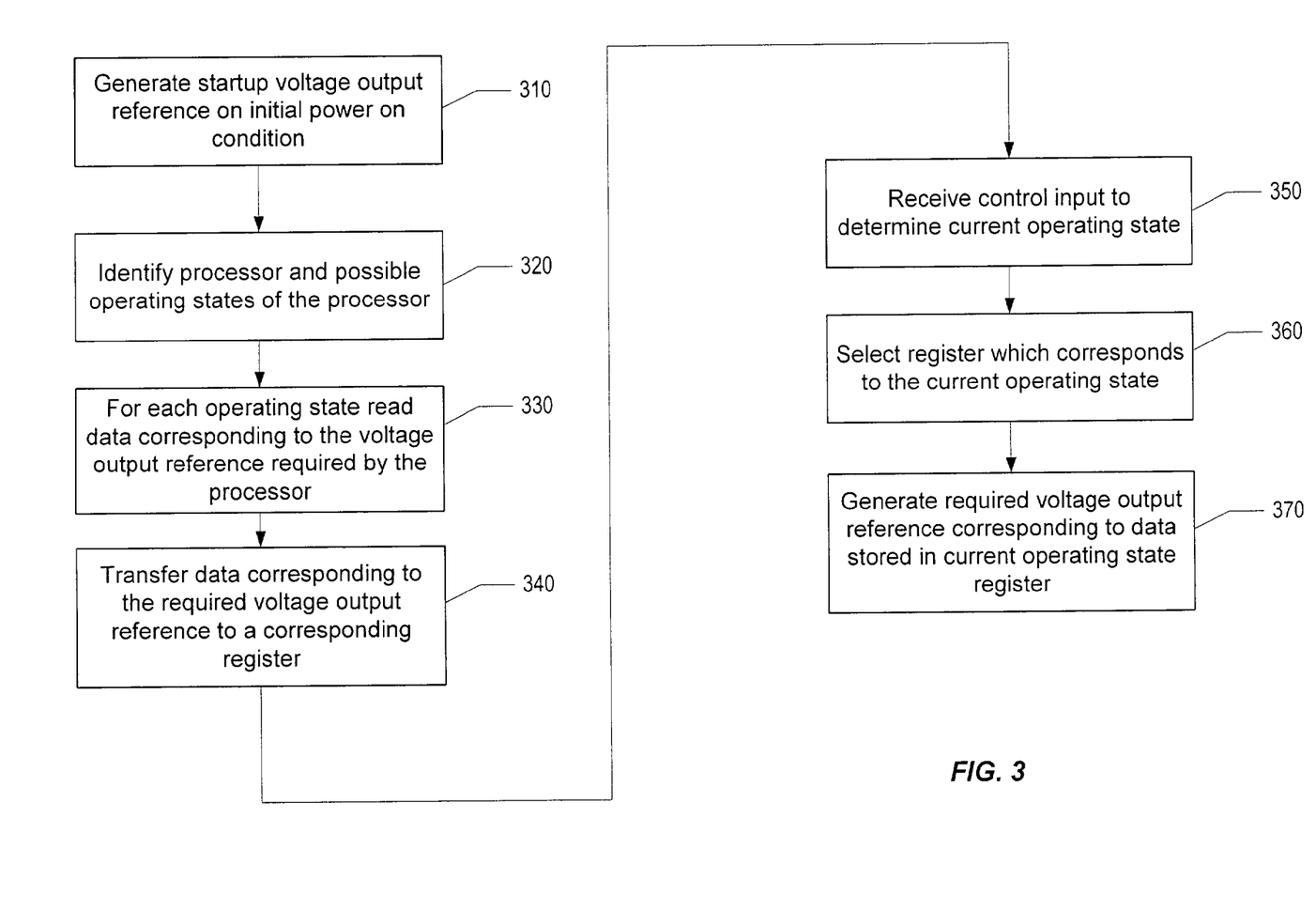
FIG. 3 illustrates a flow chart for one embodiment of a method of selecting a voltage output reference required by the DC-DC converter.

Referring to FIG. 3, one embodiment of a flow chart of a method of selecting a voltage output reference 250 required of a DC-DC converter is described. Instep 310, DC-DC converter 200 generates a startup voltage output reference when power is initially applied to the information handling system 100. DC-DC converter 200 receives inputs from processor 105 operating in a C0 battery mode. In one embodiment, the inputs are VIDO-4 230. In response to receiving the inputs, DC-DC converter 200 generates the startup voltage output reference required by processor 105.

In step 320, processor 105 is identified, preferably during startup phase of information handling system 100. In one embodiment, generating the startup voltage output reference required by processor 105 preferably occurs before the processor identification takes place. Typically the BIOS software stored in non-volatile BIOS memory 124 performs the identification of the type of processor. The BIOS software also identifies the possible power operating states, including a current operating state, for the detected processor 105. Typical examples of possible operating states and/or modes include normal state C0 in battery mode, normal state C0 in performance mode, and sleep state C3 in performance mode.

In step 330, for each of the power operating states of processor 105, the BIOS software reads data corresponding to the voltage output reference 250 of the DC-DC converter 220 required. In step 340, the data corresponding to the required voltage output reference for each operating state is transferred to a corresponding register. The number of registers required directly correspond to the number of power operating states and/or modes defined for processor 105. One of the operating states defined is a startup state for processor 105. An example of the startup state of the processor is the normal state, e.g., ACPI C0 state in the battery mode of operation. A register for startup state 218 of processor 105 is also included.

In one embodiment, startup state voltage register 218 of DC-DC converter 200 is configured to receive VIDO-4 230 inputs from processor 105 operating in normal state C0 in the battery mode during the startup. Startup state voltage register 218 stores data corresponding to the required voltage output reference 250 for the startup of processor 105. On completion of the startup, startup state register 218 may be configured to receive inputs from SMbus 240.

In step 350, a control input 255 representing the operating state of the processor, e.g., the current operating state and/or mode of processor 105, is received.

In step 360, a selection of the register output which corresponds to the current operating state is made by using the control input 255. In step 370, the registered stored data corresponding to the required voltage output of the DC-DC converter is used to generate the required voltage output reference 250.

In one embodiment, the steps 310, 320, 330 and 340 may be eliminated by storing data corresponding to the required voltage output for each operating state in a non-volatile memory location.

Figure 4A:
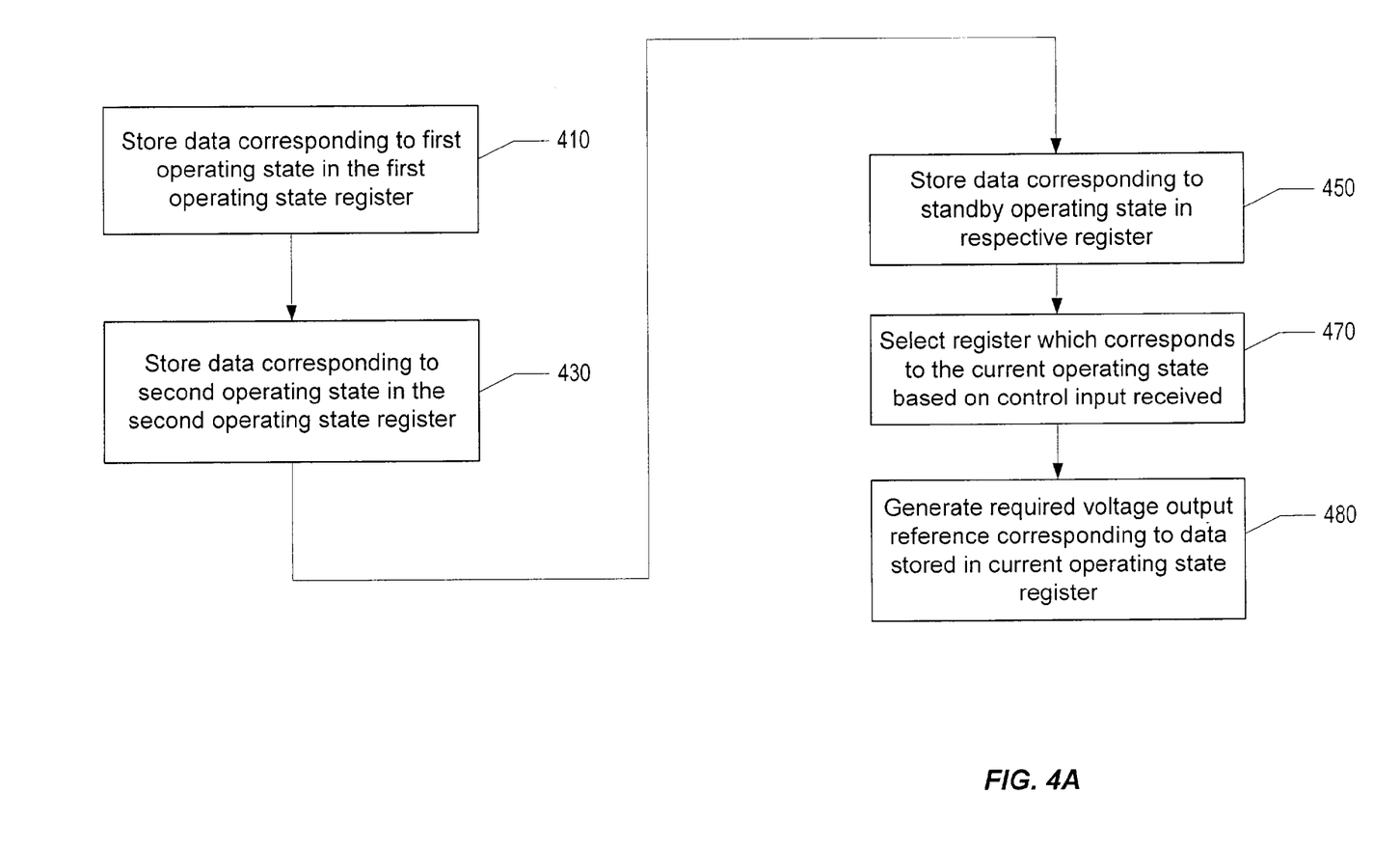
FIG. 4A illustrates a flow chart for another embodiment of a method of selecting a voltage output reference required by the DC-DC converter.

Referring to FIG. 4A, another embodiment of a flow chart of a method of selecting a voltage output reference 250 required of a DC-DC converter is described. In step 410, data corresponding to a first operating state voltage is stored in a first operating state register. An example of a first operating state is the normal state that may be mapped to ACPI C0 state in performance mode. An example of the first operating state register is register 210 that corresponds to the first operating state. In another embodiment, data corresponding to the first operating state voltage may be transferred to the first operating state register during BIOS execution. In this embodiment, processor 105 may be queried or interrogated to identify processor characteristics, e.g., type of processor operating state voltage and the like. Data received may be transferred over a system bus, e.g., SMbus, to the first operating state.

In step 430, data corresponding to a second operating state voltage is stored in a second operating state register. An example of a second operating state is the deep sleep state that may be mapped to ACPI C3 state in performance mode. An example of the second operating state register is register 212 that corresponds to the second operating state. In another embodiment, data corresponding to the second operating state voltage may be transferred to the second operating state register during BIOS execution. In this embodiment, processor 105 may be queried or interrogated to identify processor characteristics, e.g., type of processor, operating state voltage and the like. Data received may be transferred over a system bus, e.g., SMbus, to the second operating state.

In step 450, data corresponding to a startup state voltage is stored in a startup state register 218. In step 470, outputs 222 and 224 of the first operating state register, e.g., register 210, outputs 226 and 228 of the second operating state register, e.g., register 212, and outputs 242 and 244 of startup state register, e.g., register 218 are coupled to decoder 220 as an input. Additional operating state registers, such as registers 214 and 216 are also provided as input to decoder 220.

In one embodiment, register outputs e.g., output 222 and 224, may be in the form of analog voltage signals. The registers may include a digital-to-analog converter (not shown) to convert the digital data to an analog output value. In this embodiment, an analog multiplexer may be used to couple register outputs, e.g., output 222 and 224, to decoder 220.

Figure 4B:
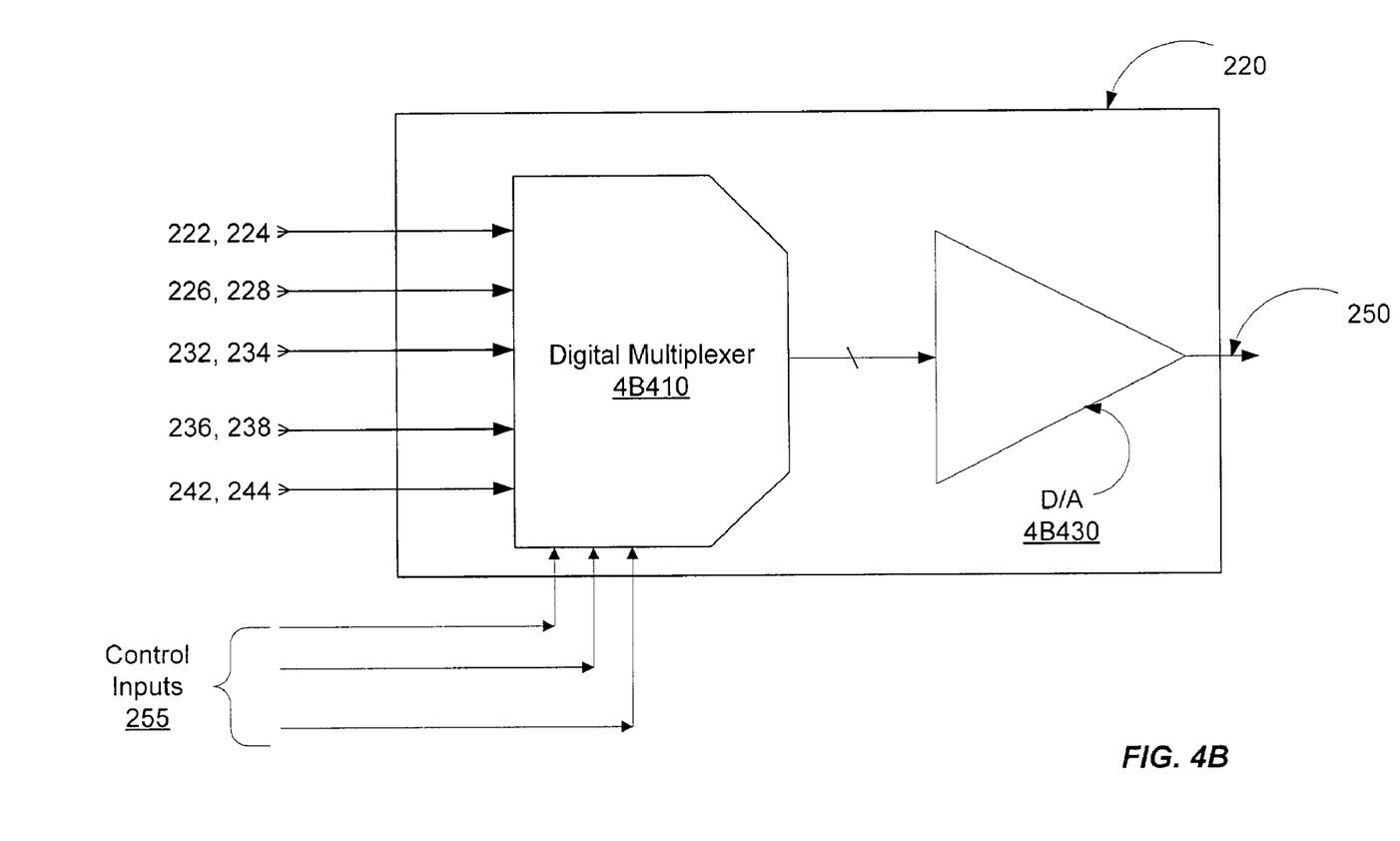
FIG. 4B illustrates a block diagram for a digital multiplexer included in a DC-DC converter.

Referring to FIG. 4B, in another embodiment, register outputs e.g., output 222 and 224, may be in the form of digital data. In this embodiment, a digital multiplexer 413410 may be configured to receive register outputs, e.g., output 222 and 224.

Referring back to FIG. 4A, in step 470, control input 255 signal is applied to decoder 220 so that control input 255 determines voltage output reference 250 that appears at decoder 220 output. In step 480, decoder 220 generates voltage output reference 250. In the embodiment that uses digital data output, decoder 220 converts digital data output of the selected register from the plurality of registers 210 through 218 into an analog value of the output voltage reference 250. A digital-to-analog converter 4B430 may be used in decoder 220 for the conversion, as illustrated in FIG. 4B.

Although the method and system of the present invention has been described in connection with the preferred embodiment, it is intended to cover such alternatives, modifications, and equivalents, as can be reasonably included within the spirit and scope of the invention as defined by the appended claims.

What is claimed is:

1. In an information handling system, a method of selecting a voltage output reference required of a DC-DC converter included in a power supply of the information handling system, the voltage output reference corresponding to an operating state of the information handling system, the method comprising:
    generating a startup voltage output reference of the DC-DC converter when power is initially provided to the information handling system;
    identifying type of a processor included in the information handling system, the processor being coupled to a memory;
    reading from the memory data corresponding to a voltage required for each of a plurality of operating states of the identified processor;
    transferring data corresponding to the voltage required for each of the plurality of operating states of the processor to a respective read-write register;
    receiving a control input representing an operating state of the processor;
    selecting an output of the respective read-write register corresponding to the operating state using the control input; and
    generating the output voltage required by the DC-DC converter based upon the selected output of the respective read-write register.

2. The method of claim 1, wherein generating the startup voltage output reference occurs prior to the identification of the processor.

3. The method of claim 1, wherein generating the startup voltage output reference comprises using a startup state voltage register to receive an input from the processor operating in a C0 battery mode.

4. The method of claim 3, wherein generating the startup voltage output reference required by the DC-DC converter occurs in response to receiving inputs from the processor.

5. The method of claim 3, wherein the inputs received from the processor are VID0-4 inputs.

6. The method of claim 1, wherein the identification of the processor is performed by a BIOS program of the information handling system.

7. In an information handling system, a method of determining a voltage applied to a processor that has a plurality of operating states and a startup state, the voltage depending on the state and type of the processor, the method comprising:
    storing data corresponding to a first operating state voltage in a first operating state register;
    storing data corresponding to a second operating state voltage in a second operating state register;
    storing data corresponding to a startup state voltage in a startup state register;
    coupling the respective outputs of the first operating state register, the second operating state register and the startup state register to a decoder; and
    applying a control signal to the decoder so that the control signal determines a reference voltage that appears at the decoder output, wherein the reference voltage corresponds to one of the first operating state voltage, the second operating state voltage or the startup voltage;
    initiating operation of the processor in the startup state; and
    during BIOS execution,
        interrogating the processor to determine processor type,
        transferring first data to the first operating state register and
        transferring second data to the second operating state register,
        whereby the first data corresponds to the first operating state voltage and the second data corresponds to the second operating state voltage.

8. A method as defined in claim 7, wherein the respective outputs of the first and the second operating state registers are in the form of digital data.

9. A method as defined in claim 8, wherein the decoder operates to (i) select, in response to the-control signal, either the digital data output of the first operating state register or the digital data output of the second operating state register and (ii) convert the selected digital data output to analog form.

10. A method as defined in claim 7, wherein the respective outputs of the operating state registers are in the form of digital data.

11. A method as defined in claim 10, wherein the decoder converts the digital data outputs of the operating state registers into analog voltages.

12. A method as defined in claim 7, wherein the respective outputs of the operating state registers are in the form of an analog voltage.

13. A method as defined in claim 7, wherein the startup state register provides an output to the decoder that corresponds to the desired startup state voltage of the processor, wherein the startup state register output is determined by a VID control signal applied to a startup state register input.

14. A method as defined in claim 7, wherein the respective outputs of the first and the second operating state registers are in the form of an analog voltage.

15. A method as defined in claim 14, wherein the decoder operates in response to the control signal to select either the analog voltage output reference of the first operating state register or the analog voltage output reference of the second operating state register.

16. An information handling system comprising:
    a processor;
    a system bus;
    a memory system coupled to the processor through the system bus;
    a power management system coupled to the processor through the system bus, the power management system comprising:
        a DC-DC controller, the DC-DC controller comprising:
            a plurality of operating state registers for storing data corresponding to operating state voltages of the processor;
            a startup state register for storing data corresponding to a startup state voltage; and
            a decoder having a plurality of voltage inputs, each of the voltage inputs coupled to respective one of the operating state registers or to the startup state register, and having a control input, the decoder for providing a reference voltage at an output in response to the control input;
    a startup circuit that reads the startup state voltage data in the startup resister and initiates operation of the processor during a startup operation,
    wherein during the startup operation the processor is interrogated to determine a processor type, first data is transferred to a first one of the plurality of operating state registers, second data is transferred to a second one of the plurality of operating state resisters, whereby the first data corresponds to the first operating state voltage and the second data corresponds to the second operating state voltage.

17. An information handling system as defined in claim 16, wherein each of the operating state registers comprises an output coupled to the decoder, wherein the output is in the form of digital data corresponding to an operating state voltage of the processor.

18. An information handling system as defined in claim 16, wherein the decoder is operable to convert digital data corresponding to an operating state voltage of the processor to an analog voltage.

19. An information handling system as defined in claim 16, wherein the decoder comprises means responsive to the control input for selecting an operating state voltage of the processor.

20. An information handling system as defined in claim 16, wherein each of the operating state registers comprises an output coupled to the decoder, wherein the output is in the form of an analog voltage.

\* \* \* \* \*